(12) United States Patent
Brane et al.

(10) Patent No.: US 6,293,298 B1
(45) Date of Patent: Sep. 25, 2001

(54) WATER SOFTENER VALVE

(75) Inventors: Earl Brane, Canal Winchester; Boyd Cornell, Pickerington, both of OH (US)

(73) Assignee: iNetWater LLC, Canal Winchester, OH (US)

( * ) Notice: Subject to any disclaimer, the term of this patent is extended or adjusted under 35 U.S.C. 154(b) by 0 days.

(21) Appl. No.: 09/258,482

(22) Filed: Feb. 26, 1999

(51) Int. Cl.[7] .................... F16K 11/065; F16K 31/02; G01F 9/00; G05D 7/06

(52) U.S. Cl. .................... 137/244; 73/198; 73/861.79; 73/861.91; 73/861.92; 137/486; 137/487.5; 137/599.13; 137/599.15; 137/625.29; 137/625.5; 210/190; 210/278

(58) Field of Search .................... 73/198, 861.77, 73/861.78, 861.79, 861.91, 861.92; 137/244, 486, 487.5, 599.11, 599.13, 599.15, 625.48, 625.49, 625.5; 210/87, 88, 89, 91, 140, 424, 425, 190, 278, 426, 427

(56) References Cited

U.S. PATENT DOCUMENTS

| | | | |
|---|---|---|---|
| 1,707,692 | * | 4/1929 | Ter Beest .................... 137/625.49 |
| 1,751,061 | * | 3/1930 | Ter Beest .................... 137/625.49 |
| 1,811,890 | * | 6/1931 | Lindsay .................... 137/625.48 |
| 2,902,155 | * | 9/1959 | Lundeen .................... 137/625.5 |
| 2,935,092 | * | 5/1960 | Stoner .................... 137/599.15 |
| 2,997,177 | * | 8/1961 | Cleary .................... 137/625.48 |
| 3,006,376 | * | 10/1961 | Schulze et al. .................... 137/625.5 |
| 3,049,237 | | 8/1962 | Whitlock et al. .................... 210/136 |
| 3,083,728 | * | 4/1963 | Schulze et al. .................... 137/599.15 |
| 3,111,486 | | 11/1963 | Soriente .................... 210/108 |
| 3,181,564 | * | 5/1965 | Rudelick .................... 137/599.15 |
| 3,183,933 | * | 5/1965 | Whitlock et al. .................... 137/625.5 |
| 3,208,476 | | 9/1965 | Clack .................... 137/599.1 |
| 3,219,046 | * | 11/1965 | Waugh .................... 137/487.5 |
| 3,225,789 | | 12/1965 | Thompson .................... 137/599.1 |
| 3,225,790 | * | 12/1965 | Laughlin .................... 137/599.15 |
| 3,237,640 | * | 3/1966 | Whitlock et al. .................... 137/625.5 |
| 3,272,217 | * | 9/1966 | Young .................... 137/487.5 |
| 3,298,396 | | 1/1967 | Gressman et al. .................... 137/637.4 |
| 3,335,752 | * | 8/1967 | Hiers et al. .................... 137/599.15 |
| 3,369,561 | * | 2/1968 | Zimmerman et al. .................... 137/487.5 |
| 3,396,845 | | 8/1968 | Bouskill .................... 210/98 |
| 3,460,566 | * | 8/1969 | Heartstedt .................... 137/599.15 |
| 3,779,281 | | 12/1973 | Brane .................... 134/625.29 |
| 4,333,486 | * | 6/1982 | Ciccozzi .................... 137/1 |
| 4,385,992 | | 5/1983 | Clauer et al. .................... 210/662 |
| 4,522,221 | * | 6/1985 | Chivens et al. .................... 137/118.07 |
| 5,054,650 | * | 10/1991 | Price .................... 137/487.5 |
| 5,056,554 | * | 10/1991 | White .................... 137/486 |
| 5,152,309 | * | 10/1992 | Twerdochlib et al. .................... 137/487.5 |
| 5,364,525 | | 11/1994 | Hagqvist et al. .................... 210/190 |
| 5,603,844 | | 2/1997 | Murphy et al. .................... 210/757 |

\* cited by examiner

*Primary Examiner*—George L. Walton
(74) *Attorney, Agent, or Firm*—Porter, Wright, Morris & Arthur

(57) ABSTRACT

A water softener valve for controlling water flow to and from a water softener is disclosed that includes a cylindrical shaft extending from said inner surface of a piston chamber that fits into a pressure relief port when the piston is in the service position. The shaft clears the pressure relief port of any debris and closes the pressure relief port during the service cycle. The water softener valve also has a flow meter with at least two helically expanding vanes. A magnet on of the vanes trips a sensor as the turbine rotates, thereby providing means for calculating the flow of water through the valve. The valve also has a flow control button located at an inlet of the valve rather than at the drain, preventing the obstruction of the water flow by regeneration sediment of the tank at the drain. The valve also contains an internal piston port for permitting the free flow of water through the valve during a change in softener cycles.

15 Claims, 7 Drawing Sheets

WATER SOFTENER VALVE

BACKGROUND OF THE INVENTION

1. Field of the Invention

This invention pertains to the art of methods and apparatuses for controlling the flow of water to and from a water softener, and more specifically to methods and apparatuses for providing a valve that controls water flow to and from a water softener while at the same time measuring the water flow.

2. Description of the Related Art

Household water softeners that use ion exchange resins typically include an ion exchange resin tank through which hard water passes to exchange its hard ions of calcium and magnesium for soft sodium ions from the resin bed. Regeneration of the bed is required periodically to remove the accumulation of hard ions and replenish the supply of soft ions. Regeneration is effective by flushing the tank with a solution of salt, i.e., a brine solution, to replenish the sodium ions in the resin bed.

The water softener typically requires a valve to control the flow of water to and from the water softener tank during the service and regeneration cycles. Past water softener control valves have typically included small passageways through which water must travel during operation of the valve. However, because inlet water and backwash water typically contains mineral deposits and other contaminants, small and narrow passageways in the water softener valve tend to become blocked.

During operation of the water softener, it is also important to measure the flow of water through the water softener. The water flow may be used to more accurately time the regeneration cycle of the water softener The flow meters in past water softeners have typically either operated in a manner that disturbs the flow of water through the water softener tank or required tight tolerances during the production of the water softener valve, which increased the time and cost of production of the water softener valve.

Some water softener valves also operate with the assistance of electrical power. Water softeners in the past have often shut down and remained stuck in a particular cycle during power outages.

The present invention contemplates a new and improved water softener valve which is simple in design, effective in use, and overcomes the foregoing difficulties and others while providing better and more advantageous overall results.

SUMMARY OF THE INVENTION

In accordance with the present invention, a new and improved water softener valve is provided that includes an apparatus for cleaning specific small passageways within the water softener valve, a flow meter which does not obstruct the flow of water through the water softener tank and may be produced without tight tolerances, and is designed to operate efficiently and under situations where electrical power is interrupted.

According to one aspect of the present invention, a water softener valve for controlling water flow to and from a water softener is disclosed. The water softener valve includes a chamber for receiving water that has an inner surface, a piston moveable within the chamber between a service position and a backwash position, and a pressure relief port within the piston permitting the flow of water from the chamber to a drain port as the piston moves from the backwash position to the service position. The water softener valve also includes a cylindrical shaft extending from the inner surface of the chamber. The shaft fits into the pressure relief port when the piston is in the service position, and the shaft clears the pressure relief port of any debris.

According to another aspect of the present invention, a water softener valve for controlling the water flow to and from a water softener is disclosed that includes a flow meter The flow meter has a turbine with two opposing vanes expanding helically to an expanded portion of the turbine. The flow meter also includes a magnet exposed within one of the two opposing vanes and a counting apparatus for counting the number of times the magnet passes the counting apparatus. A rate of water flow through the flow meter is directly proportional to the number of times the magnet passes the counting apparatus. The counting apparatus creates an electrical impulse in the presence of the magnet.

According to another aspect of the present invention, a water softener valve controlling water flow to and from the water softener is disclosed which includes a chamber for receiving water that has an inner surface, a piston moveable within the chamber to a service position and a backwash position, and a pressure relief port in the piston permitting the a flow of water from a chamber into a drain port as the piston moves from the backwash position to the service position. The water softener valve also includes a diaphragm fitted around a portion of the piston between the piston and the chamber, a first piston seal positioned around a central portion of the piston, first and second piston seats, and a piston port. The first piston seal is movable between the first piston seat in the service position and the second piston seat in the backwash position. The piston port is opened as the first piston seal moves from the first piston seat in the service position to the second piston seat in the backwash position. The piston port is closed as the first piston seal moves from the second piston seat in the backwash position to the first piston seat in the service position.

One advantage of the present invention is that the cylindrical shaft extending from the inner surface operates to clear the pressure relief port in the piston of the any debris. Debris in the pressure relief port would prevent water flowing through the pressure relief port, thereby preventing the piston from returning to the service position.

Another advantage of the present invention is that each solenoid valve is in the closed position during the standard service cycle of the water softener. In the event that there is a power outage, inlet water continues to flow through the water softener valve and through the water softener tank, providing continuous water service.

Another advantage of the present invention is that the flow meter does not obstruct the flow of water through the water softener valve. The flow meter may also be inserted into a valve port without tight tolerances, thereby reducing the time and cost associated with assembling the water softener valve.

Another advantage of the present invention is the inclusion of a piston port in the valve that allows backwash water to move through the valve to drain port at full flow and unobstructed.

Another advantage of the present invention is the placement of a backwash flow control button at an inlet opening rather than at the drain port. The positioning of the backwash flow control button at the inlet opening allows influent water to be regulated before passing through the water softener tank and exiting the drain, thereby reducing the chance of obstruction of water flow through the water softener valve by debris exiting the drain during backwash.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

DESCRIPTION OF THE PREFERRED EMBODIMENT

Figure 1:
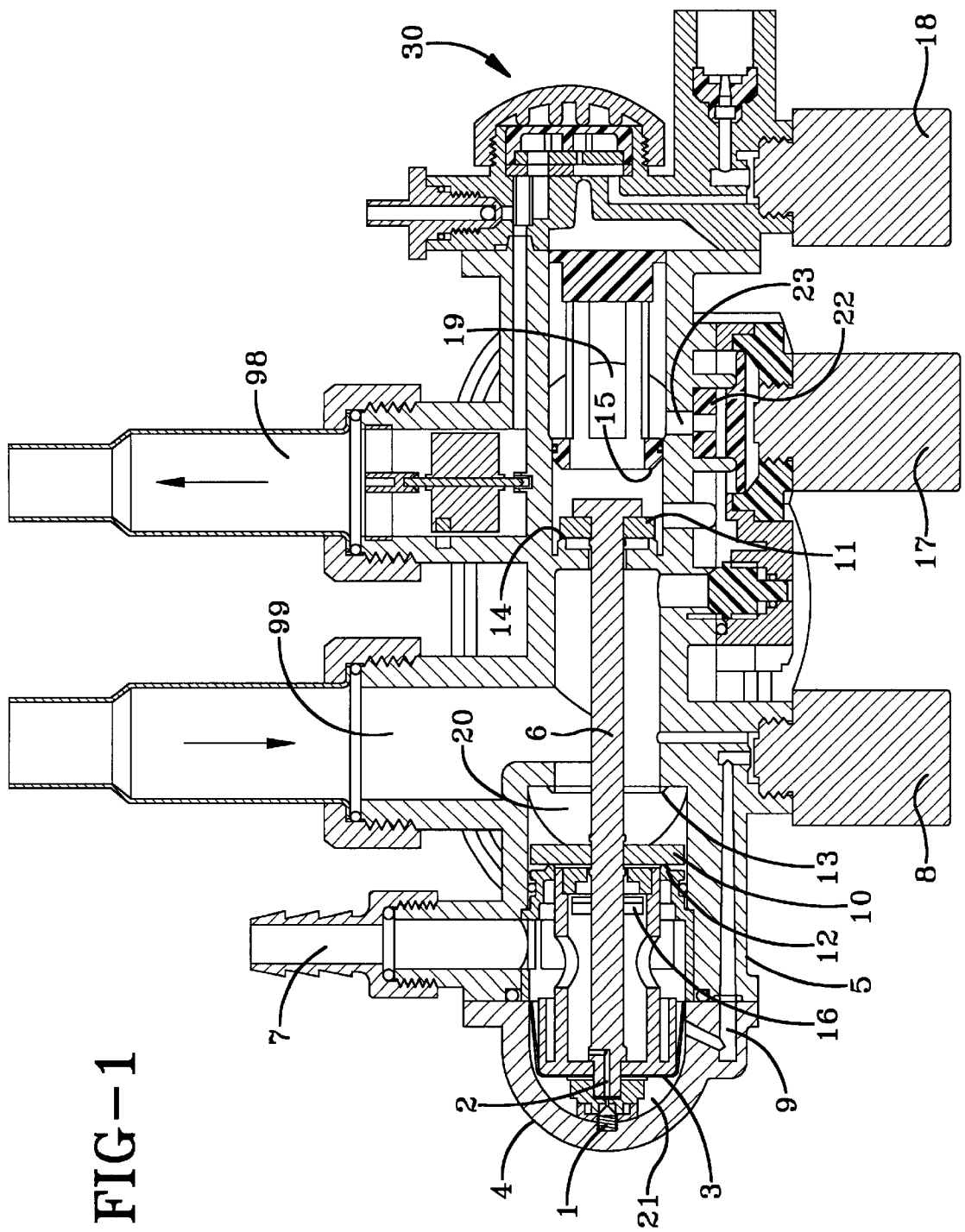
FIG. 1 is a top, cross-sectional view of a water softener valve.
Figure 2:
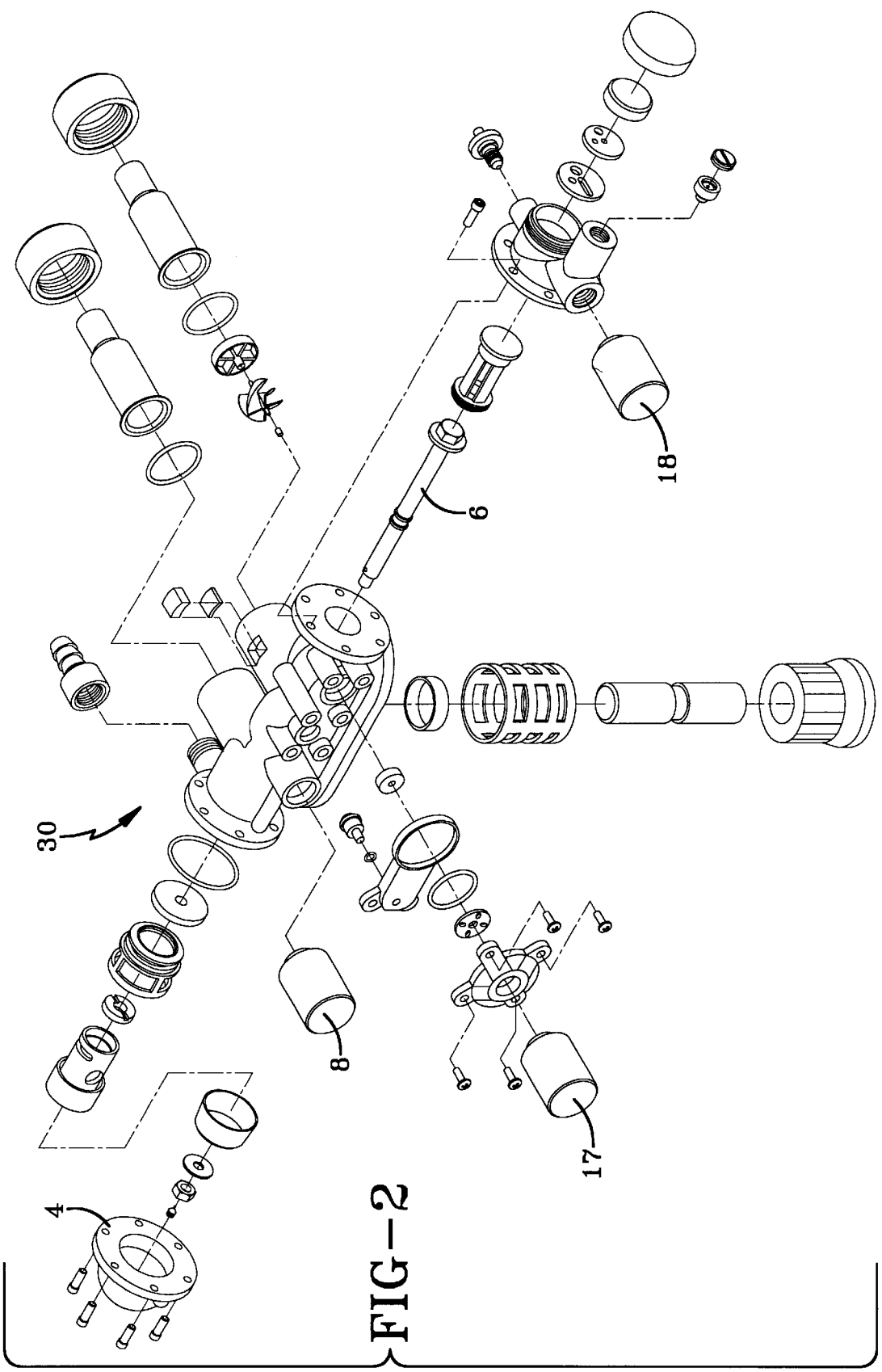
FIG. 2 shows an exploded view of the water softener valve.

Referring now to the drawings wherein the showings are for purposes of illustrating a preferred embodiment of the invention only and not for purposes of limiting the same, FIG. 1 shows a top, cross-sectional view of a water softener valve 30 that controls the flow of water to and from an associated water softener tank (not shown), and FIG. 2 shows an exploded view of the water softener valve 30. The water softener valve 30 is controlled by three solenoid valves 8,17,18 that open and close ports 16,19,20,70,73 within the water softener valve 30. The pertinent solenoid valve 8 for discussion of the present invention is the solenoid valve 8 that, when closed, as shown in FIG. 1 places the water softener in the service and refill position. When solenoid valve 8 is open, as shown in FIG. 3, the water softener valve 30 is in the backwash and brine position.

Figure 3:
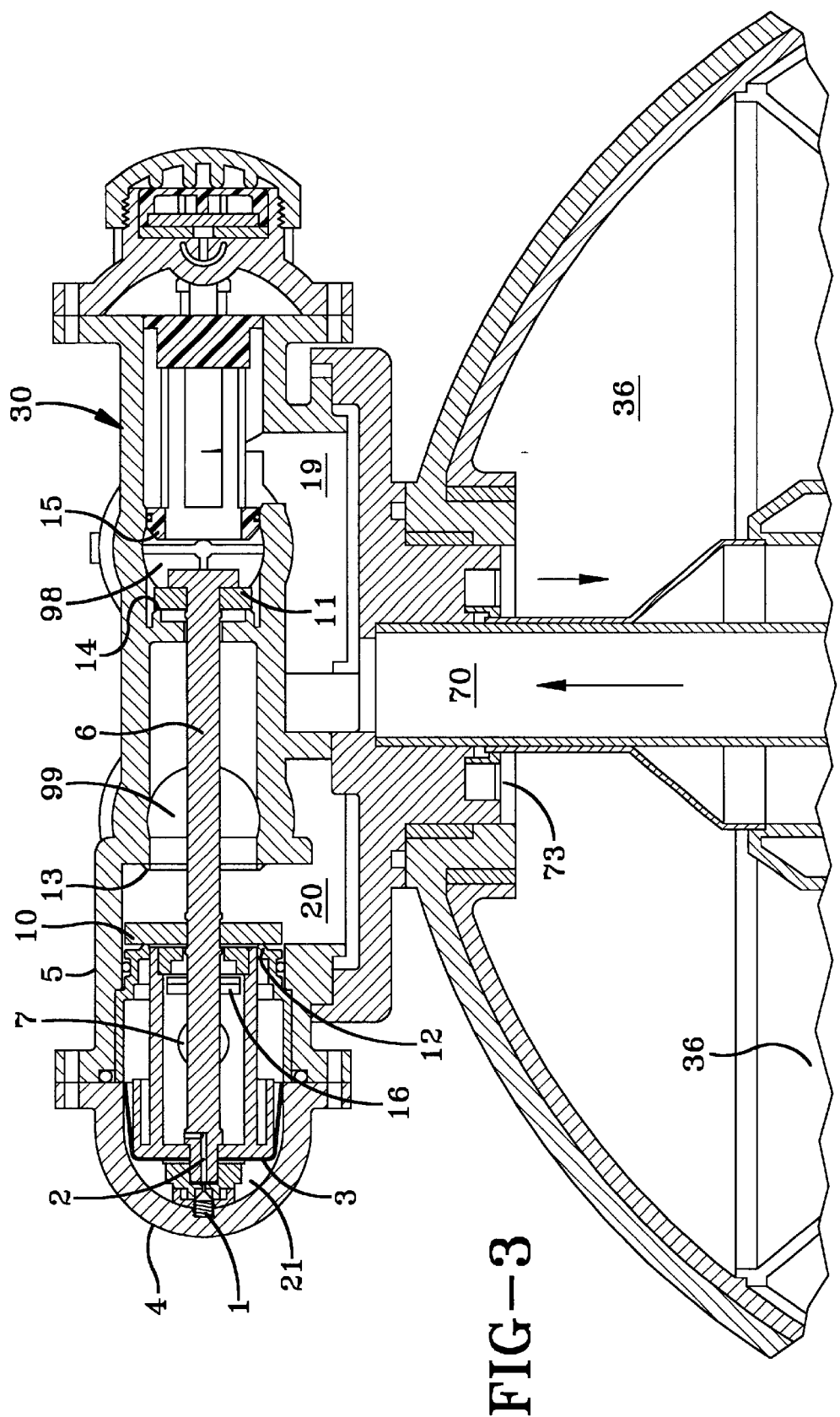
FIG. 3 shows a cross-sectional side view of the water softener valve in the service position.
Figure 4:
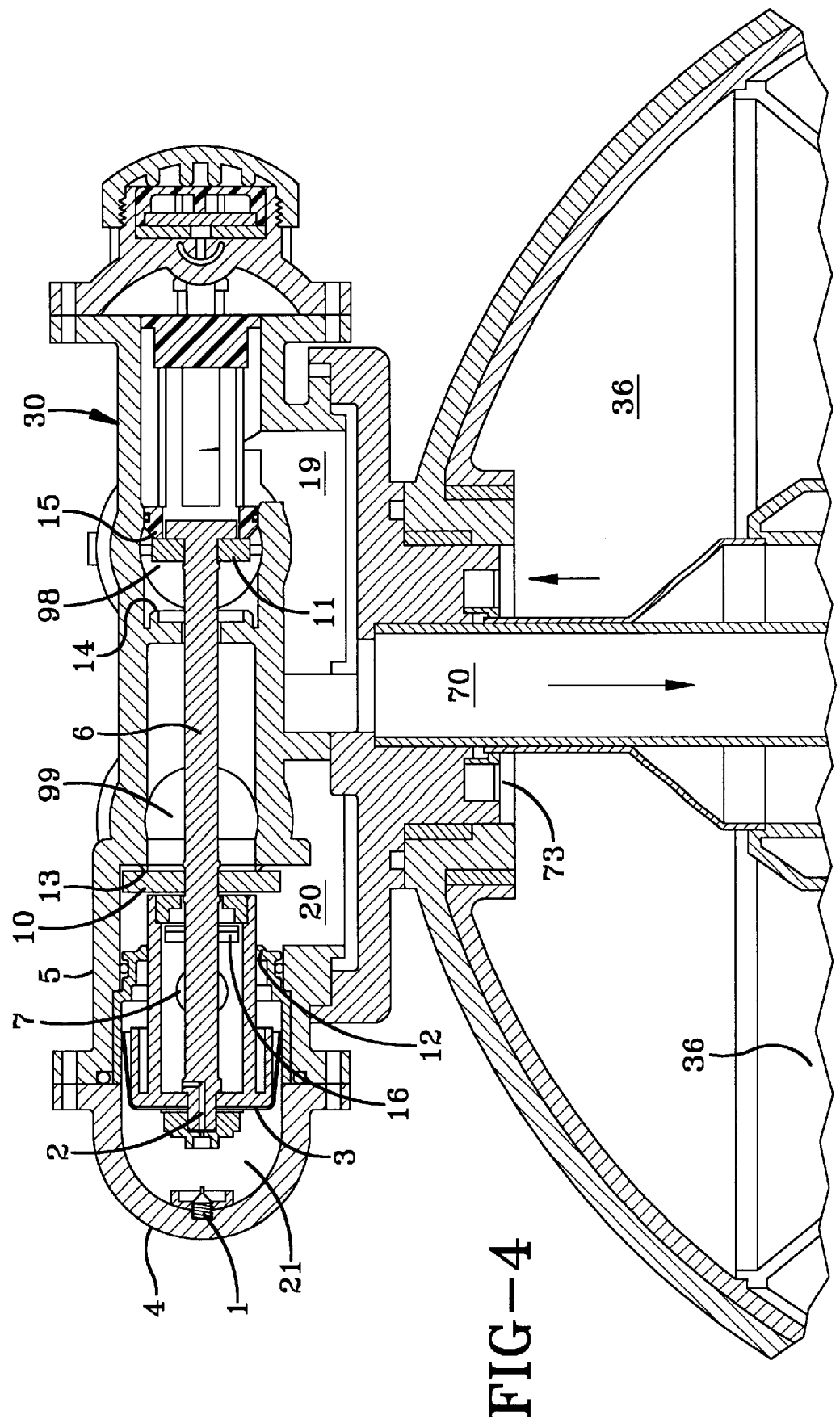
FIG. 4 shows a cross-sectional side view of a water softener valve in the backwash and/or brine position.

With continuing reference to FIGS. 1 and 2, FIGS. 3 and 4 show a cross-sectional side view of the water softener valve 30 on top of water softener tank 36. Specially, FIG. 3 shows the water softener valve 30 with solenoid valve 8 in the closed position. When solenoid valve 8 is in the closed position, the water softener 30 allows water to flow through tank port 73 into the water softener tank 36. FIG. 4 shows the water softener valve 30 with solenoid valve 8 in the open position. When solenoid valve 8 is in the open position, the water flow is reversed, with water flowing into water softener 36 through tank port 70.

During operation of the water softener, solenoid valve 18 remains in the closed position, allowing water to flow from a water source into water softener valve 30 through inlet 26. During the service cycles, shown in FIGS. 1 and 3, solenoid valves 8 and 17 remain closed. Water that has entered the water softener valve 30 through inlet 99 moves through valve port 20 and port 73 into the water softener tank 36. The water then passes through at least one ion exchange resin where it is softened, i.e., where calcium and magnesium ions in the water are exchanged for sodium ions. The water then returns to the water softener valve 30 through port 70 and port 19. The water then exits the water softener valve 30 at port 98 and is directed toward the residential or industrial use for which it is intended.

Often times, the ion exchange resins in the water softener tank 36 require regeneration. Regeneration may occur with a simple backwash of water, or regeneration may require a brine solution from a brine storage tank. FIG. 4 shows the water softener valve 30 during backwash and brine cycles. During a backwash cycle, water enters through inlet 99. However, solenoid valve 8 opens, allowing the water to enter into chamber 21. The water in chamber 21 forces the piston 6 to the backwash/brine/rinse position. The piston seals 10,11 move off piston seats 12,14 and contact piston seats 13,15. When in this position, solenoid valve 17 is open to allow inlet water pass through port 19 and port 23 into port 70 and back up into the water softener valve 30 through port 73 and port 20. The water then continues through piston port 16 to drain port 7. Piston port 16 allows the backwash water to flow through to drain port 7 at fill flow and unobstructed. Piston port 16 is preferably semicircular in shape to conform with the piston 6. When a brine solution is required, solenoid valve 18 opens allowing brine solution into the water softener valve 30 which then travels through port 19 into port 70 and back up into the water softener valve 30 through port 73 and port 20 and continues through piston port 16 to drain port 7. At the end of the backwash and brine cycles, solenoid valve 8 is closed, stopping the flow of water into chamber 21. The release of water pressure caused by cessation of flow of water into chamber 21 allows the piston 6 to return to the service position, with the piston seals 10,11 in contact with piston seats 12,14. Inlet pressure caused by the closing of solenoid valves 17,18, which allows water to flow through the inlet 99 into the water softener valve 30, also forces the piston 6 back into the service position. It is a feature of the present invention that each of the solenoid valves 8,17,18 are closed during the service cycle. This allows for operation of the water softener during a power outage.

Figure 5:
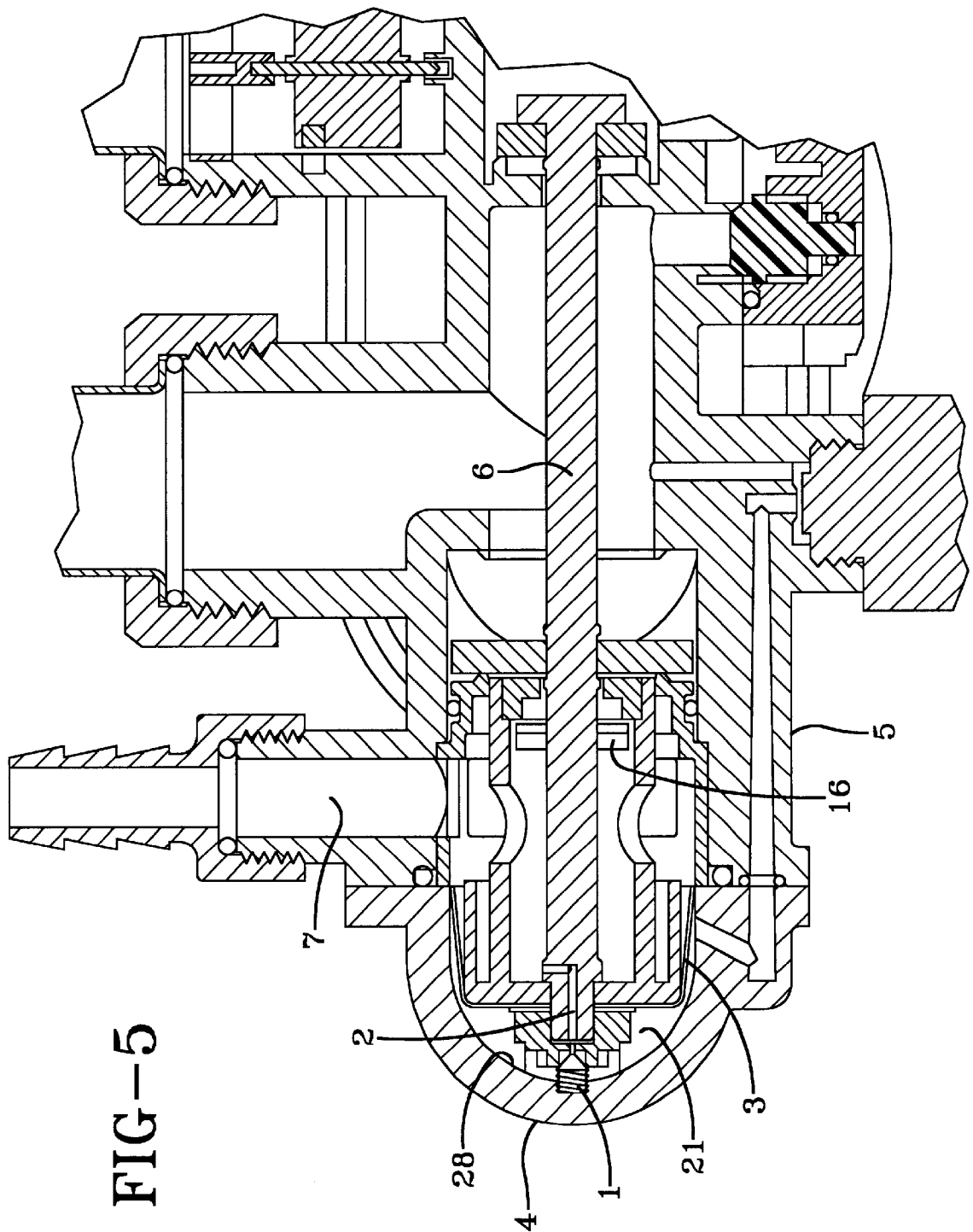
FIG. 5 shows a detailed view of the cylindrical shaft and pressure relief port.

As shown in FIG. 5, with continuing reference to FIGS. 1–4, a cylindrical shaft 1 is located within the inner surface 28 of the valve wall 4 in chamber 21 in water softener valve 30. The cylindrical shaft 1 extends inwardly from the inner surface and fits into a pressure relief port 2 within the piston 6 that moves back and forth when solenoid valve 8 opens and closes. The pressure relief port 2 is used to relieve pressure within chamber 21. When pressure is applied to chamber 21 side of diaphragm 3 by open solenoid valve 8, water flows into the chamber 21. The cylindrical shaft 1 disengages the pressure relief port 2 of the piston 6 as the piston 6 moves away from the chamber 21 and allows a small amount of water to run to the drain 7. When solenoid valve 8 is closed, the constant pressure on the chamber 21 side of the diaphragm 3 is removed. Water escapes through the pressure relief port 2 as the piston 6 returns to the service position. The cylindrical shaft 1 then prevents materials from obstructing the pressure relief port 2, thereby allowing the piston 6 to operate normally. If the pressure relief port 2 would become obstructed, the pressure on the chamber 21 side of the diaphragm 3 would not be relieved, therefore preventing the piston 6 from returning to the service position.

Figure 6:
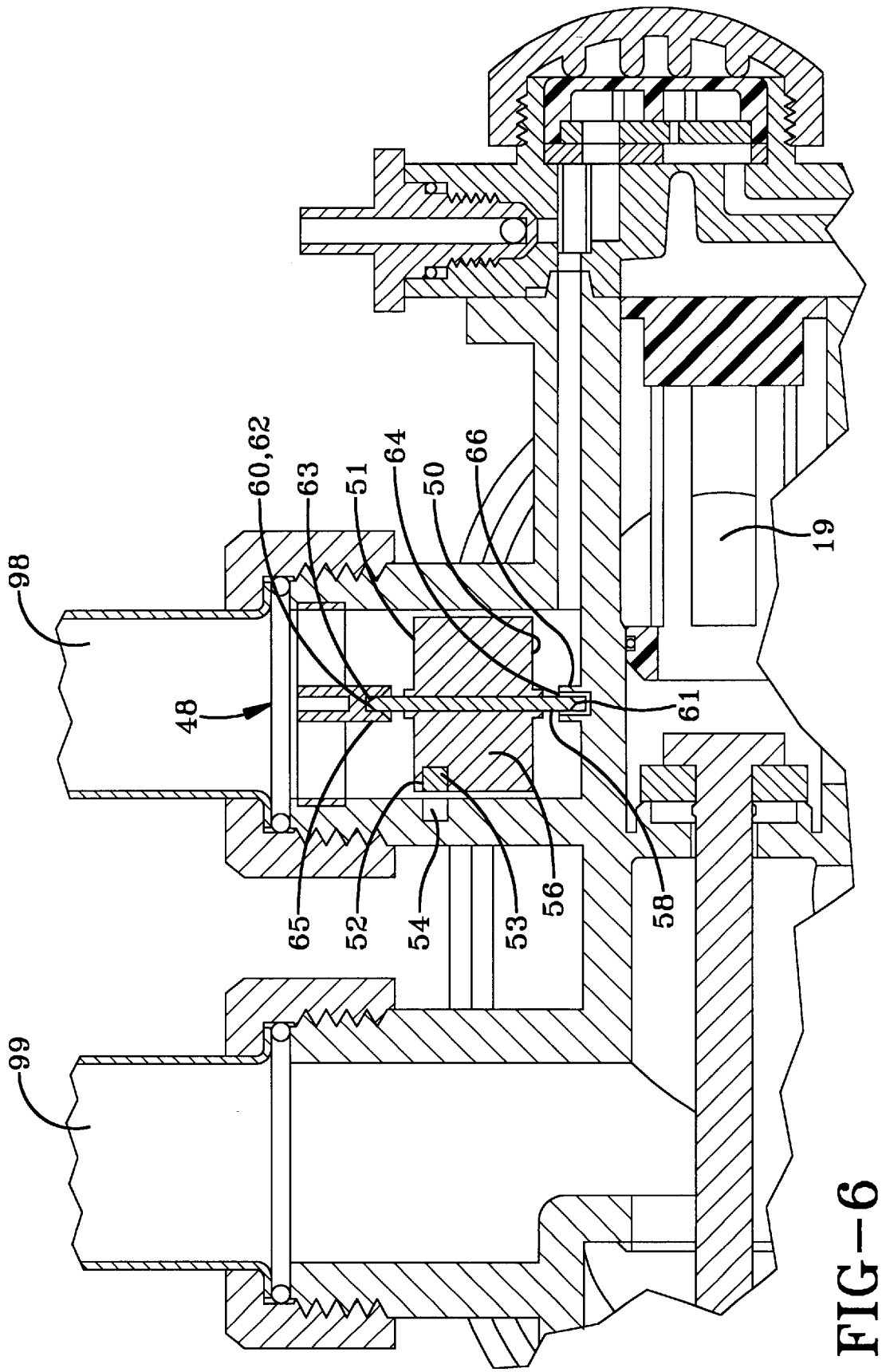
FIG. 6 shows a detailed view of the flow meter.
Figure 7:
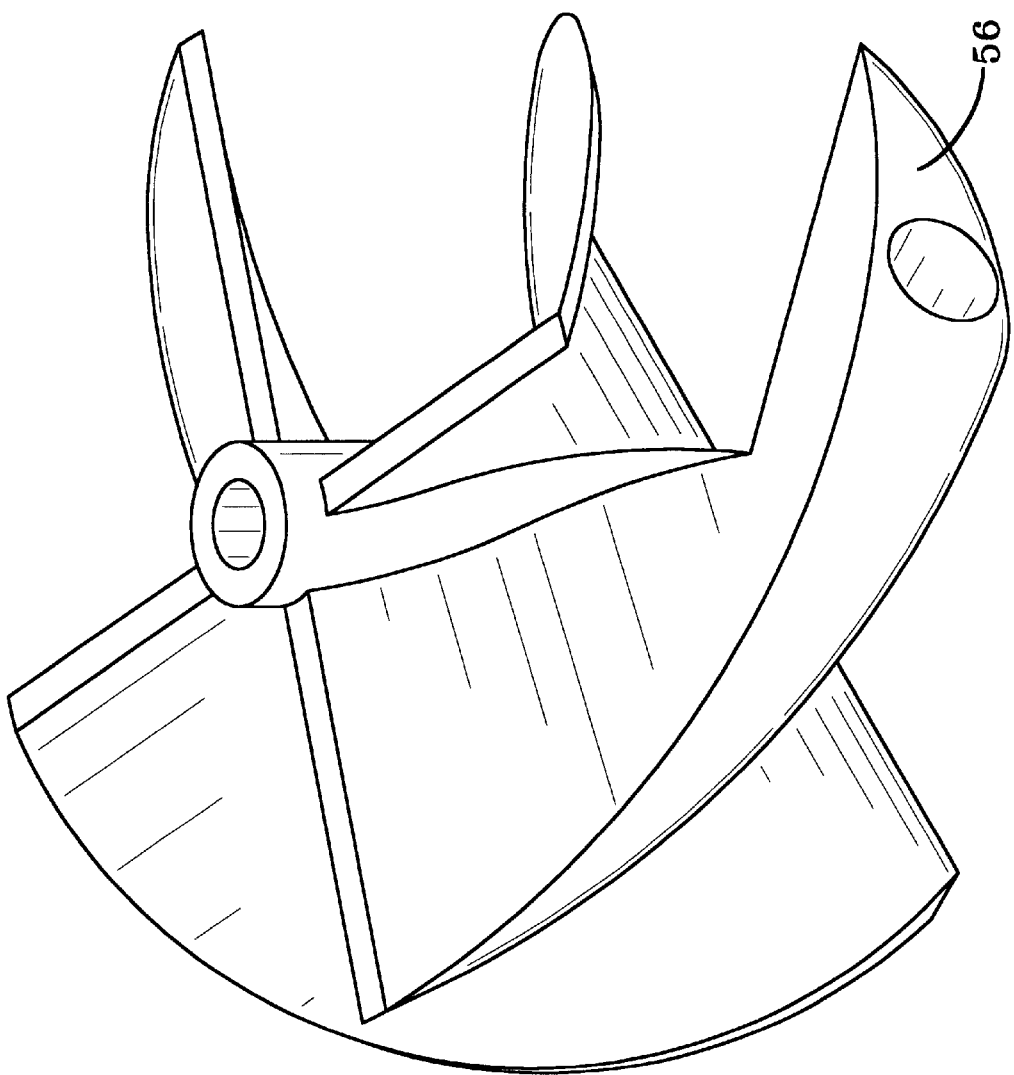
FIG. 7 shows a perspective view of the flow meter turbine.

As shown in FIGS. 6 and 7, with continuing reference to FIGS. 1–5, the water softener valve 30, preferably within valve port 98, has a flow meter 48. The flow meter 48 has at least two opposing, helically expanding vanes 50 that form a turbine 56. FIG. 7 shows a perspective view of a preferred embodiment of the turbine 56. The turbine 56 spins as water flows through valve port 98. The flow meter 48 has a magnet 53 located on one or the two opposing vanes 50. A sensor 54 detects when the magnet passes the sensor 54 as the magnet 53 spins within the port 98. The flow of water through port 98 from the water softener tank 36 is metered by the number of times the magnet 53 passes the sensor 54. The metered rate may then be used to schedule the regeneration cycles of the water softener.

The turbine 56 is supported within the port 98 by axle 58 that is engaged with bushings 65,66 within the port 98. The axle 58 preferably has a conical shape coming to a point at each end 60,61. The points 60,61 contact a thrust service 62 within the bushings 65,66 when an axial load is applied. By having a single point contact, friction is greatly reduced. The axle 58 also has toroidal bearings 63,64 just past the conical ends 60,61 that contact the bushings 65,66. When radial loads are applied to the turbine 56, friction is greatly reduced by having single point contacts with the tangents of the toroidal bearings 63,64 and the bushings 65,66. Further, by having an axle 58 free to move axially inside the bushings 65,66 at each end 60,61, there is no need to hold tight tolerances during production of the water softener valve.

To improve flow and flow characteristics, placement of a backwash flow control button 22 is placed at opening 23, therefore allowing influent water to be regulated before passing through the water softener tank 36 and exiting through the drain port 7. A typical placement in prior water softeners was at the drain opening 7. The advantage of placing flow control button 22 at opening 23 as opposed to drain port 7 is that during the backwash cycle, sediment that is being flushed from the water softener tank 36 and exiting at drain port 7 does not become entangled with the flow control button 22. At drain port 7 there is no restriction caused by the flow control button 22. The small opening at control button 22, if placed at drain port 7, can cause sediment to be trapped, therefore creating reduced flow rate. This may cause the control button 22 to malfunction, keeping the ion exchange resins in the water softener tank 36 from being cleaned properly. Also, placing the flow control button 22 at opening 23 removes back pressure caused by the flow control button 22 that may have occurred if the flow control button was placed at drain port 7 during the brine cycle. This back pressure can cause a malfunction of the venturi effect which is used during the brine cycle.

In a preferred embodiment of the invention, all of the valve components, except where materially restricted, i.e. the magnet 53, are made of plastic.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

We claim:

1. A water softener valve for controlling water flow to and from a water softener, comprising:

a water inlet for water to be conditioned to enter the valve;

a water outlet for conditioned water to exit the valve;

a drain port for water to exit the valve;

first and second tank ports;

a chamber for receiving water, said chamber having an inner surface;

a piston movable within said chamber between a service position and a backwash position, said piston permitting flow of water from the water inlet to the first tank port and from the second tank port to the water outlet when in said service position, said piston permitting flow of water from said water inlet to the second tank port and from the first tank port to the drain port when said piston is in the backwash position, said piston having a pressure relief port permitting flow of water from said chamber into the drain port as said piston moves from said backwash position to said service position; and a flow meter positioned to measure flow through the water outlet which occurs when the piston is in the service position, said flow meter having a turbine, said turbine having at least two opposing vanes, a magnet carried by said turbine, and a sensor for counting a number of times said magnet passes said sensor, rate of water flow through said flow meter being directly proportional to the number of times said magnet passes said sensor, said sensor creating an electrical impulse in the presence of said magnet, said flow meter further comprising an axle supporting said turbine, said axle having a first end disposed within a first bushing and a second end disposed within a second bushing, said first end being substantially conical in shape, said first end having a first point, a first conical base, and a first toroidal bearing at said first conical base, said second end having a second conical base, and a second toroidal bearing at said second conical base, wherein the first and second toroidal bearings are located within the first and second bushings respectively and form single point contact at tangents of the first and second toroidal bearings to reduce friction when radial loads are applied to the flow meter, wherein said first and second points are free to contact thrust surfaces within said first and second bushings respectively and form single point contact therebetween to reduce friction when axial loads are applied to the flow meter, and wherein said axle is free to axially move within said first and second bushings.

2. The water softener valve of claim 1, further comprising a diaphragm fitted around a portion of said piston between said piston and said chamber.

3. The water softener valve of claim 1, further comprising a first piston seal positioned around a central portion of said piston, first and second piston seats, said first piston seal being movable between said first piston seat in said service position and said second piston seat in said backwash position, and said piston having a central passage and a piston port communicating the central passage with an exterior surface of the piston, said piston port being opened as said first piston seal moves from said first piston seat in said service position to said second piston seat in said backwash position so that fluid can flow into said central passage through said piston port and past said first piston seat through said central passage, and said piston port being closed as said first piston seal moves from said second piston seat in said backwash position to said first piston seat in said service position so that fluid is prevented from entering the central passage through said piston port and thereby prevented from flowing past said first piston seat through said central passage.

4. The water softener valve of claim 3, wherein said piston port is an opening in said piston having a shape substantially similar to said first piston seal and located in said piston where said first piston seal contacts said first piston seat, said opening being covered by said first piston seal when said first piston seal contacts said first piston seat in said service position, said opening being uncovered to allow a flow of water through said piston port to said drain port as said piston seal is moved to said second piston seat in said backwash position.

5. The water softener valve of claim 4, further comprising a second piston seal positioned around a distal portion of said piston, and third and fourth piston seats, said second piston seal being movable between said third piston seat in said service position and said fourth piston seat in said backwash position.

6. The water softener valve of claim 1, wherein said two opposing vanes each expand helically from a first end portion of the turbine and having a first thickness to a second end portion of said turbine and having a second thickness, and wherein said second thickness is greater than said first thickness.

7. A water softener valve for controlling water flow to and from a water softener, comprising:

a water inlet for water to be conditioned to enter the valve;

a water outlet for conditioned water to exit the valve;

a drain port for water to exit the valve;

first and second tank ports;

a chamber for receiving water, said chamber having an inner surface;

a piston movable within said chamber between a service position and a backwash position, said piston permitting flow of water from the water inlet to the first tank port and from the second tank port to the water outlet when in said service position, said piston permitting flow of water from said water inlet to the second tank port and from the first tank port to the drain port when said piston is in the backwash position, said piston having a pressure relief port permitting flow of water from said chamber into the drain port as said piston moves from said backwash position to said service position;

a fixed cylindrical shaft extending from said inner surface of said chamber, said shaft fitting into said pressure relief port when said piston is in said service position to clear said pressure relief port of any debris, said shaft controlling water flow through the relief port upon movement of the piston between the service and backwash positions;

a diaphragm fitted around a portion of said piston between said piston and said chamber;

a first piston seal positioned around a central portion of said piston;

first and second piston seats, said first piston seal being movable between said first piston seat in said service position and said second piston seat in said backwash position;

said piston having a piston port, said piston port being opened as said first piston seal moves from said first piston seat in said service position to said second piston seat in said backwash position, said piston port being closed as said first piston seal moves from said second piston seat in said backwash position to said first piston seat in said service position, wherein said piston port is an opening in said piston having a shape substantially similar to said first piston seal and located in said piston where said first piston seal contacts said first piston seat, said opening being covered by said first piston seal when said first piston seal contacts said first piston seat in said service position, said opening being uncovered to allow a flow of water through said piston port to said drain as said piston seal is moved to said second piston seat in said backwash position;

a second piston seal positioned around a distal portion of said piston;

third and fourth piston seats, said second piston seal being movable between said third piston seat in said service position and said fourth piston seat in said backwash position; and a flow meter positioned to measure flow through the water outlet which occurs when the piston is in the service position, said flow meter having a turbine, said turbine having two opposing vanes expanding helically to an expanded end portion of said turbine, a magnet disposed within one of said two opposing vanes, and a sensor for counting a number of times said magnet passes said sensor, rate of water flow through said flow meter being directly proportional to the number of times said magnet passes said sensor, said sensor creating an electrical impulse in the presence of said magnet, said flow meter further comprising an axle supporting said turbine, said axle having a first end disposed within a first bushing and a second end disposed within a second bushing, said first end being substantially conical in shape, said first end having a first point, a first conical base, and a first toroidal bearing at said first conical base, said second end having a second conical base, and a second toroidal bearing at said second conical base, wherein the first and second toroidal bearings are located within the first and second bushings respectively and form single point contact at tangents of the first and second toroidal bearings to reduce friction when radial loads are applied to the flow meter, wherein said first and second points are free to contact thrust surfaces within said first and second bushings respectively and form single point contact therebetween to reduce friction when axial loads are applied to the flow meter, and wherein said axle is free to axially move within said first and second bushings.

8. The water softener valve of claim 1, further comprising a backwash flow control button located at an inlet opening of said water softener valve, said backwash flow control button regulating flow of influent water before passing through said water softener to backwash water softener media and exiting a drain port of the water softener.

9. The water softener valve of claim 1, further comprising a first solenoid valve, said first solenoid valve allowing water to flow into said chamber when open, water being forced out of said chamber by said piston when said solenoid valve is closed, a second solenoid valve, said second solenoid valve directing flow of water to and from an associated water softener tank, said second solenoid valve being closed during surface operation of said water softener and open during backwash of said associated water softener tank, and a third solenoid valve for switching between the water inlet when closed and a source of brine solution when open.

10. A water softener valve for controlling flow to and from a water softener, comprising:

a water inlet for water to be conditioned to enter the valve;

a water outlet for conditioned water to exit the valve;

a drain port for water to exit the valve;

first and second tank ports;

a chamber for receiving water, said chamber having an inner surface;

a piston movable within said chamber between a service position and a backwash position, said piston permitting flow of water from the water inlet to the first tank port and from the second tank port to the water outlet when in said service position, said piston permitting flow of water from said water inlet to the second tank port and from the first tank port to the drain port when said piston is in the backwash position, said piston having a pressure relief port permitting a flow of water from said chamber into the drain port as said piston moves from said backwash position to said service position;

a first piston seal positioned around a central portion of said piston;

first and second piston seats, said first piston seal being movable between said first piston seat in said service position and said second piston seat in said back wash position; said piston having a central passage and a piston port communicating the central passage with an exterior surface of the piston, said piston port being opened as said first piston seal moves from said first piston seat in said service position to said second piston seat in said backwash position so that fluid can flow into said central passage through said piston port and past said first piston seat through said central passage, and said piston port being closed as said first piston seal moves from said second piston seat in said backwash position to said first piston seat in said service position so that fluid is prevented from entering the central passage through said piston port and thereby prevented from flowing past said first piston seat through said central passage; and a fixed cylindrical shaft extending from said inner surface of said chamber, said shaft fitting into said pressure relief port when said piston is in said service position to clear said pressure relief port of any debris, said shaft controlling water flow through the relief port upon movement of the piston between the service and backwash positions.

11. The water softener valve of claim 1, further comprising a fixed cylindrical shaft extending from said inner surface of said chamber, said shaft fitting into said pressure relief port when said piston is in said service position to clear said pressure relief port of any debris, said shaft controlling water flow through the relief port upon movement of the piston between the service and backwash positions.

12. The water softener valve of claim 6, wherein said second end portion of at least one of said opposing vanes has an opening therein and said magnet is located within said opening.

13. A water softener valve for controlling water flow to and from a water softener, comprising:

a water inlet for water to be conditioned to enter the valve;

a water outlet for conditioned water to exit the valve;

a drain port for water to exit the valve;

first and second tank ports;

a chamber for receiving water, said chamber having an inner surface;

a piston movable within said chamber between a service position and a backwash position, said piston permitting flow of water from the water inlet to the first tank port and from the second tank port to the water outlet when in said service position, said piston permitting flow of water from said water inlet to the second tank port and from the first tank port to the drain port when said piston is in the backwash position, said piston having a pressure relief port permitting flow of water from said chamber into a drain port as said piston moves from said backwash position to said service position; and a flow meter positioned to measure flow through the water outlet which occurs when the piston is in the service position, said flow meter having a turbine comprising at least two opposing vanes, a magnet carried by said turbine, and a sensor for counting a number of times said magnet passes said sensor, rate of water flow through said flow meter being directly proportional to the number of times said magnet passes said sensor, said sensor creating an electrical impulse in the presence of said magnet, wherein said at least two opposing vanes each expand helically from a first end portion of said turbine and having a first thickness to a second end portion of said turbine and having a second thickness, and wherein said second thickness is greater than said first thickness.

14. The water softener valve of claim 13, wherein said second end portion of at least one of said opposing vanes carries said magnet entirely within the second thickness.

15. The water softener valve of claim 13, wherein said second end portion of at least one of said opposing vanes has an opening therein and said magnet is located within said opening.

* * * * *